US008760673B2

(12) United States Patent  
Kojima

(10) Patent No.: US 8,760,673 B2  
(45) Date of Patent: Jun. 24, 2014

(54) IMAGE DISPLAYING APPARATUS AND IMAGE DISPLAYING METHOD

(75) Inventor: Takayoshi Kojima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 736 days.

(21) Appl. No.: 13/011,190

(22) Filed: Jan. 21, 2011

(65) Prior Publication Data

US 2011/0181911 A1 Jul. 28, 2011

(30) Foreign Application Priority Data

Jan. 25, 2010 (JP) ................................. 2010-012889

(51) Int. Cl.
*G06F 3/12* (2006.01)
*G09G 5/00* (2006.01)

(52) U.S. Cl.
USPC .......................... 358/1.13; 358/1.15; 345/619

(58) Field of Classification Search
CPC ...................................................... G06T 11/60
USPC .................................. 358/1.1, 1.15; 345/619
See application file for complete search history.

(56) References Cited

U.S. PATENT DOCUMENTS 8,139,136 B2 * 3/2012 Iwamoto ................. 348/333.02
2007/0189585 A1 * 8/2007 Sukegawa et al. ............ 382/118

FOREIGN PATENT DOCUMENTS

| CN | 201203870 Y | 3/2009 |
| CN | 101616252 A | 12/2009 |
| JP | 2006-279460 A | 10/2006 |
| JP | 2009-089051 A | 4/2009 |

* cited by examiner

*Primary Examiner* — King Poon
*Assistant Examiner* — Iriana Cruz
(74) *Attorney, Agent, or Firm* — Global IP Counselors, LLP

(57) ABSTRACT

An image display apparatus includes a face region detecting section configured to detect a face region of a person in each of a plurality of main images; a face importance degree determining section configured to determine a degree of importance within each of the main images of a face region detected in each the main images; and a display position setting section configured to set a common display position of a sub image with respect to the main images based on the importance degree of a face region in each of the main images.

6 Claims, 9 Drawing Sheets

PRIORITY DEGREE OF SUB IMAGE DISPLAY REGIONS: A (DEFAULT) > B > C > D

| PERSON | P1 | P2 | P3 | No Registration |
|---|---|---|---|---|
| FEATURE QUANTITY (FACIAL FEATURE INFORMATION) | T1 | T2 | T3 | --- |
| IMPORTANCE DEGREE | 100 | 50 | 20 | 10 |

Fig. 8

| SUB IMAGE DISPLAY REGION | | IMAGE 1 | IMAGE 2 | IMAGE 3 | IMAGE 4 | IMAGE 5 | IMAGE 6 | TOTAL |
|---|---|---|---|---|---|---|---|---|
| A | OVERLAPPING FACE REGION | NONE | NONE | P3 | NONE | P11 | P3, P11 | |
| A | CALCULATED IMPORTANCE DEGREE | 0 | 0 | 20 | 0 | 10 | 20+10=30 | 60 |
| B | OVERLAPPING FACE REGION | NONE | NONE | NONE | NONE | P2 | NONE | |
| B | CALCULATED IMPORTANCE DEGREE | 0 | 0 | 0 | 0 | 50 | 0 | 50 |
| C | OVERLAPPING FACE REGION | NONE | NONE | NONE | NONE | P1 | P12 | |
| C | CALCULATED IMPORTANCE DEGREE | 0 | 0 | 0 | 0 | 100 | 10 | 110 |
| D | OVERLAPPING FACE REGION | NONE | NONE | NONE | P1 | NONE | NONE | |
| D | CALCULATED IMPORTANCE DEGREE | 0 | 0 | 0 | 100 | 0 | 0 | 100 |

Fig. 9

| SUB IMAGE DISPLAY REGION | | IMAGE 1 | IMAGE 2 | IMAGE 3 | IMAGE 4 | IMAGE 5 | IMAGE 6 | HIGHEST IMPORTANCE DEGREE |
|---|---|---|---|---|---|---|---|---|
| A | OVERLAPPING FACE REGION | NONE | NONE | P3 | NONE | P11 | P3, P11 | P3 |
| A | CALCULATED IMPORTANCE DEGREE | 0 | 0 | 20 | 0 | 10 | 20, 10 | 20 |
| B | OVERLAPPING FACE REGION | NONE | NONE | NONE | NONE | P2 | NONE | P2 |
| B | CALCULATED IMPORTANCE DEGREE | 0 | 0 | 0 | 0 | 50 | 0 | 50 |
| C | OVERLAPPING FACE REGION | NONE | NONE | NONE | NONE | P1 | P12 | P1 |
| C | CALCULATED IMPORTANCE DEGREE | 0 | 0 | 0 | 0 | 100 | 10 | 100 |
| D | OVERLAPPING FACE REGION | NONE | NONE | NONE | P1 | NONE | NONE | P1 |
| D | CALCULATED IMPORTANCE DEGREE | 0 | 0 | 0 | 100 | 0 | 0 | 100 |

Fig. 10

IMAGE DISPLAYING APPARATUS AND IMAGE DISPLAYING METHOD

CROSS-REFERENCE TO RELATED APPLICATIONS

This application claims priority to Japanese Patent Application No. 2010-012889 filed on Jan. 25, 2010. The entire disclosure of Japanese Patent Application No. 2010-012889 is hereby incorporated herein by reference.

BACKGROUND

1. Technical Field

The present invention relates to an image displaying apparatus and an image displaying method.

2. Related Art

Such devices as photo viewers have employed a conventional display scheme in which a sub image, e.g., an icon or a character string providing photographic information or other information, is overlaid with respect to a main image of a principal subject. For example, Japanese Laid-Open Patent Application No. 2009-89051 presents a technology in which a main image is displayed in a main screen and a sub screen displaying a sub image can be displayed overlapping the main screen. The display of the main screen and the sub screen is controlled in accordance with a position of a face in the image displayed in the main screen such that the face can be seen.

SUMMARY

In Japanese Laid-Open Patent Application No. 2009-89051, a position and a size of the sub screen are controlled such that the sub screen does not overlap the face image in the main screen and a transparency degree of the sub screen is controlled such that the face can be seen when the sub screen does overlap the face. When the faces of two or more people are in the main screen and the sub screen overlaps any of the faces, there is a possibility that the sub screen will overlap the face of an important person whose face is preferably not hidden. Also, even if the face image shows through the sub screen, it will still be difficult to see.

The present invention was conceived to resolve at least a portion of the problems described above and this object can be accomplished with the aspects of the invention described below.

An image display apparatus according to a first aspect can display a plurality of main images sequentially while also displaying a sub image overlapping the main images, the image display apparatus including: a face region detecting section configured to detect a face region of a person in each of the main images; a face importance degree determining section configured to determine a degree of importance within each of the main images of a face region detected in each the main images; and a display position setting section configured to set a common display position of the sub image with respect to the main images based on the importance degree of the face region in each of the main images.

In an image display apparatus according to this aspect, the face importance degree determining section determines an importance degree of a face region displayed in each the main images. The display position setting section then sets a display position of the sub image to a common display position in the main images based on the importance degree of the face region. By setting a common display position for the sub image in the main images based on the importance degree of the face region, the sub image can be displayed in a position where it does not overlap a face region having a high importance degree. As a result, the face of an important person whose face is preferably not hidden can be seen without being hidden by the sub image. Also, since the display position of the sub image is a common position that does not move in response to the content of the main images, a user can check the content of the sub image more readily.

The image display apparatus as described above preferably further includes a storage section configured to store facial feature information in which a feature quantity regarding a face image of a person is registered and person importance degree information in which an importance degree of a person corresponding to the facial feature information is registered; a facial feature detecting section configured to detect a feature quantity of a face region detected by the face region detecting section; a face recognizing section configured to identify a person shown in the face region by matching a feature quantity detected by the facial feature detecting section to facial feature information stored in the storage section. The face importance degree determining section is configured to determine an importance degree of a detected face region based on stored person importance degree information corresponding to the identified person.

In an image display apparatus according to this aspect, the face recognizing section identifies a person shown in a face region by comparing a feature quantity detected in the face region to previously stored facial feature information. The face importance degree determining section then determines an importance degree of the face region based on person importance degree information corresponding to the identified person. As a result, an importance degree of a face region displayed in a main image can be obtained based on previously registered facial feature information and person importance degree information.

In the image display apparatus as described above, a plurality of sub image display regions are preferably defined in advance as prospective regions for displaying a sub image within a display region of the main images; the display position setting section is preferably configured to set a display position of a sub image by determining an importance degree of each face region detected in the main images whose display position overlaps with any of the prospective sub image display regions and, for each of the prospective sub image display regions, calculating at least one from among a sum value, a maximum value, and an average value of the importance degrees of the face regions overlapped by that particular sub image display region.

In an image display apparatus according to this aspect, the display position setting section determines the importance degrees of the face regions overlapped by each of the predefined sub image display regions and sets a display position of a sub image by calculating at least a sum value, a maximum value, or an average value of the importance degrees corresponding to each of the sub image display regions. In this way, the apparatus an importance degree calculation method can be determined based on variety of perspectives depending on a user's situation.

In the image display apparatus as described above, the image position setting section preferably sets a display position of a sub image based on an importance degree set in advance with respect to the main images.

With an image display apparatus according to this aspect, since the display position of a sub image is set based on importance degrees set in advance for the main images, a situation in which the face of a person having a high degree of importance in a main image is hidden by a sub image can be avoided and that person's face can be seen.

An image display method according to another aspect of the present invention is a method by which a plurality of main images can be displayed sequentially while also displaying a sub image overlapping the main images. The image display method includes: detecting a face region in the main image data; determining a region importance degree of a detected face region; setting a position of the second display region based on the region importance degree of the main image data displayed in the first display region.

With an image display method according to this aspect, an importance degree of a face region displayed in each of the main images is determined in the face importance degree determining step. Then, in the display position setting step, a display position of the sub image is set to a common display position in the main images based on the importance degree of the face region. By setting a common display position for the sub image in the main images based on the importance degree of the face region, the sub image can be displayed in a position where it does not overlap a face region having a high importance degree. As a result, the face of an important person whose face is preferably not hidden can be seen without being hidden by the sub image. Also, since the display position of the sub image is a common position that does not move in response to the content of the main images, a user can check the content of the sub image more readily.

BRIEF DESCRIPTION OF THE DRAWINGS

Referring now to the attached drawings which form a part of this original disclosure:

FIG. 8 is an example of a person table based on facial feature information and person importance degree information.

FIG. 9 illustrates an example of calculating importance degrees for each of the sub image display regions.

FIG. 10 illustrates an example of calculating importance degrees for each of the sub image display regions in accordance with a variation of an embodiment.

DETAILED DESCRIPTION OF EXEMPLARY EMBODIMENTS

An image display apparatus according to an embodiment of the present invention will now be explained with reference to the drawings.

Constituent Components of the Image Display Apparatus

First, constituent components of an image display apparatus according to the embodiment will explained.

Figure 1:
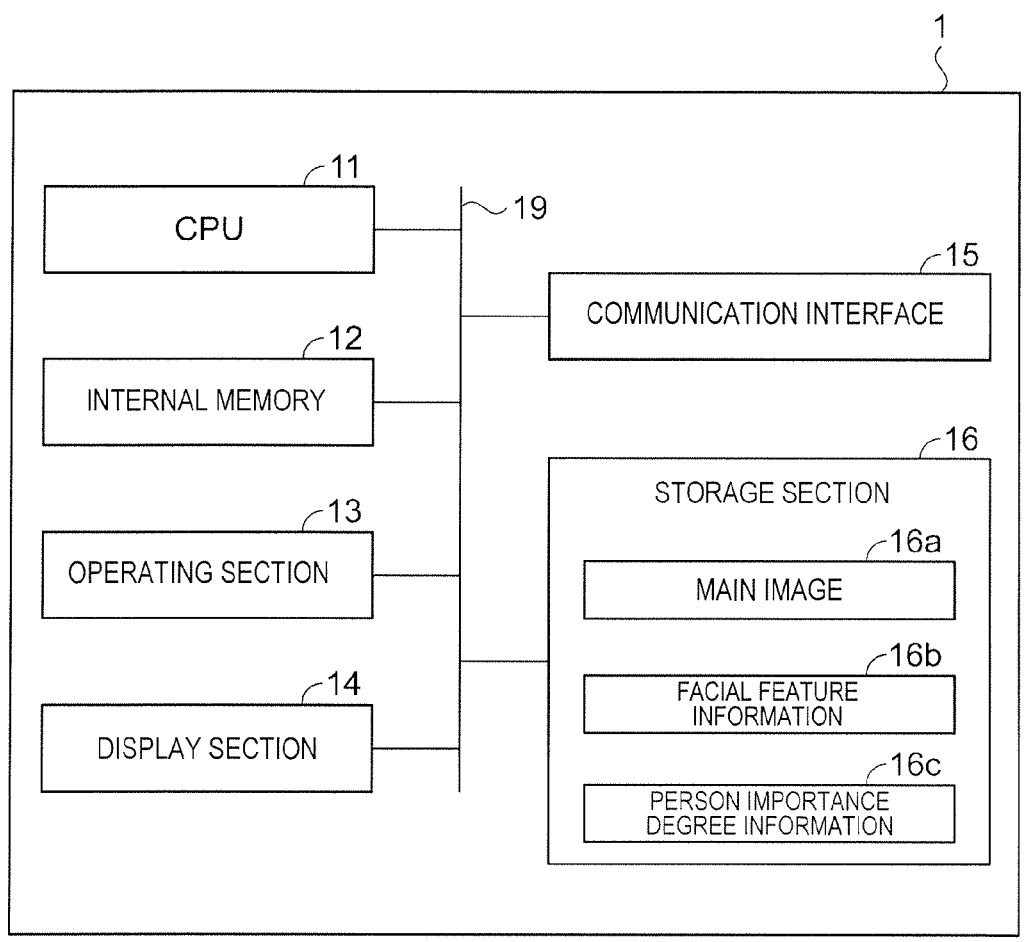
FIG. 1 is a block diagram showing hardware components of an image display apparatus.

FIG. 1 is a block diagram showing hardware components of the image display apparatus 1. The image display apparatus can be, for example, a functional component of a photo viewer, a printer, a projector, a computer, a digital camera, a cellular telephone, or other information processing device.

The image display apparatus 1 comprises a CPU 11, an internal memory 12, an operating section 13, a display section 14, a communication interface 15, and a storage section 16.

The CPU (central processing unit) 11 serves to control the other components just mentioned and is configured to execute various control operations in accordance with programs stored in the internal memory 12. The internal memory 12 comprises a ROM (read only memory) that stores various types of data and programs used by the CPU 11 and a RAM (random access memory) in which data and programs to be executed by the CPU 11 are stored temporarily.

The operating section comprises buttons, a touch panel, or the like that can be operated by a user to communicate operation content to the CPU 11. The display section 14 comprises a liquid crystal display or other display device configured to display an image corresponding to data supplied from the CPU 11. The communication interface 15 is an interface for exchanging image data with a digital camera or other information device.

The storage section 16 is, for example, an EEPROM (electronically erasable programmable read only memory), a flash memory or other non-volatile memory, or a hard disk. The storage section 16 stores a plurality of main images 16a, e.g., images of a person or scenery, transferred from, for example, a digital camera or other information device through the communication interface 15. Facial feature information 16b in which a feature quantity regarding a face image of a person is registered and person importance degree information 16c in which an importance degree of a person corresponding to the facial feature information is registered are registered in advance.

Figure 2:
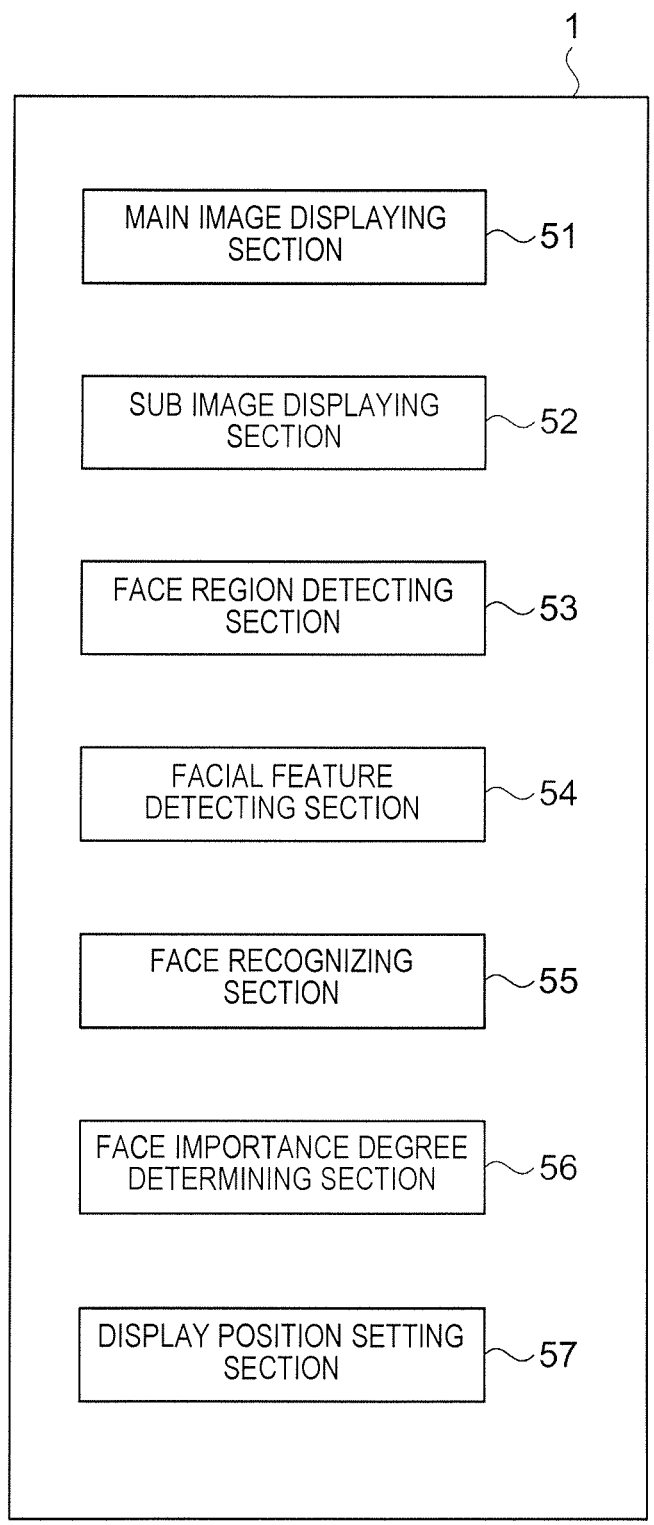
FIG. 2 is a block diagram showing functional components of an image display apparatus.

FIG. 2 is a block diagram showing functional components of the image display apparatus 1. As shown in the figure, the image display apparatus 1 includes the following functions: a main image displaying section 51, a sub image displaying section, a face region detecting section 53, a facial feature detecting section 54, a face recognizing section 55, a face importance degree determining section 56, and a display position setting section 57. The CPU 11 accomplishes these functions by executing prescribed programs stored in the internal memory 12.

The main image displaying section 51 is configured to sequentially display a plurality of main images stored in the storage section 16 one by one across an entire screen of the display section 14. The sub image displaying section 52 is configured to display a sub image, e.g., an icon, a character string providing photographic information, or a histogram, such that the sub image overlaps a portion of a main image. For this purpose, a plurality of sub image display regions are defined in advance as prospective regions for displaying a sub image within a display region of the main images. Defining information including a display position within the display region of the main images, a region size, and a degree of priority is registered in advance with respect to each of the sub image display regions. The defining information can be set as required by a user through the operating section 13.

The face region detecting section 53 is configured to detect all face regions contained in each main image 16a stored in the storage section 16. In this embodiment, the face regions are detected using a well-known detection method, such as a pattern matching method that uses a template (e.g., Japanese Laid-open Patent Publication No. 2006-279460).

The facial feature detecting section 54 is configured to detect a feature quantity of a face in a face region detected by the face region detecting section 53. The feature quantity is used to recognize the face of a person in the face region. Feature quantities include such things as organ outlines of a face, eyes, and a mouth in the face region and relative positions of these parts within the face region. In this embodiment, similarly to detection of a face region, a facial organ is detected using a well-known detection method, such as pattern matching using a template.

The face recognizing section 55 is configured to identify a person shown in a face region detected by the face region detecting section 53 by matching a feature quantity detected in the face region by the facial feature detecting section 54 to facial feature information 16*b* stored in the storage section 16.

The face importance degree determining section 56 is configured to find an importance degree of the face region of each person identified by the face recognizing section 55 in each of the main images 16*a* by referring to person importance degree information 16*c* registered in the storage section 16. A face region having a high importance degree will be less likely to be hidden by an overlapping sub image when it is displayed in the main images 16*a* than a face region having a low importance degree. Conversely, a face region having a low importance degree will be more likely to be hidden by an overlapping sub image when it is displayed in the main images 16*a* than a face region having a high importance degree.

The display position setting section 57 is configured to set which of the prospective sub image display regions will be used to display a sub image based on the face regions detected by the face region detecting section 53. More specifically, the display position setting section 57 sets a sub image display region based on degrees of priority the sub image display regions or based on the face region importance degrees found by the face importance determining section 56.

Operation of the Image Display Apparatus

Operation an image display apparatus according to the embodiment will now explained.

Figure 3:
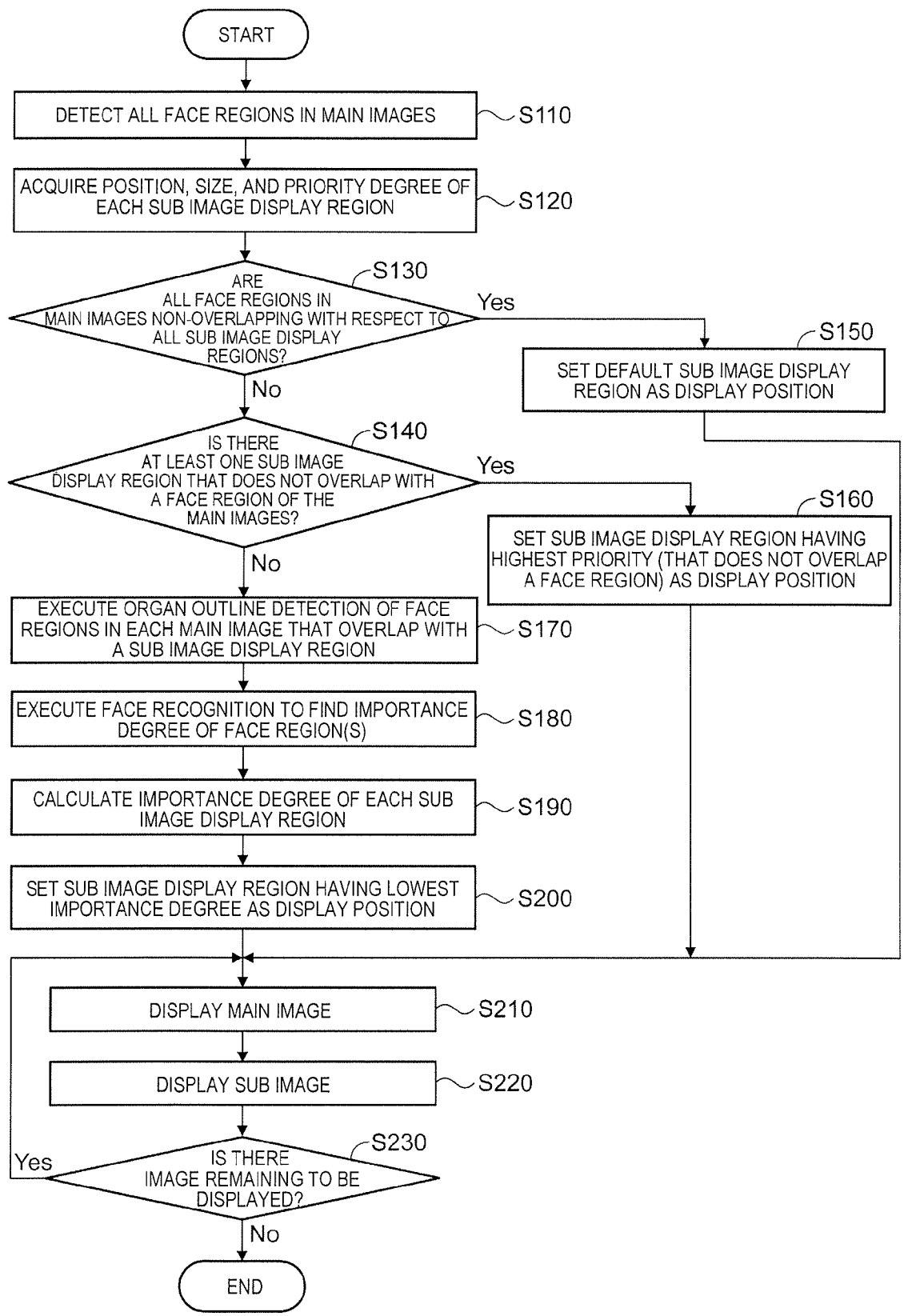
FIG. 3 is a flowchart explaining operation of an image display apparatus.

FIG. 3 is a flowchart explaining the operation of an image display apparatus 1 according to this embodiment.

First, the image display apparatus 1 detects all of the face regions of people in each of the main images 16*a* stored in the storage 16 utilizing the face region detecting section 53 (step S110). This flowchart illustrates an example in which a person is included in the main images 16*a*.

Next, the image display apparatus 1 acquires from the storage section 16 a display position, region size, and priority degree of each of the sub image display regions where a sub image can be displayed overlapping a portion of a display region of a main image (step S120).

Figure 4:
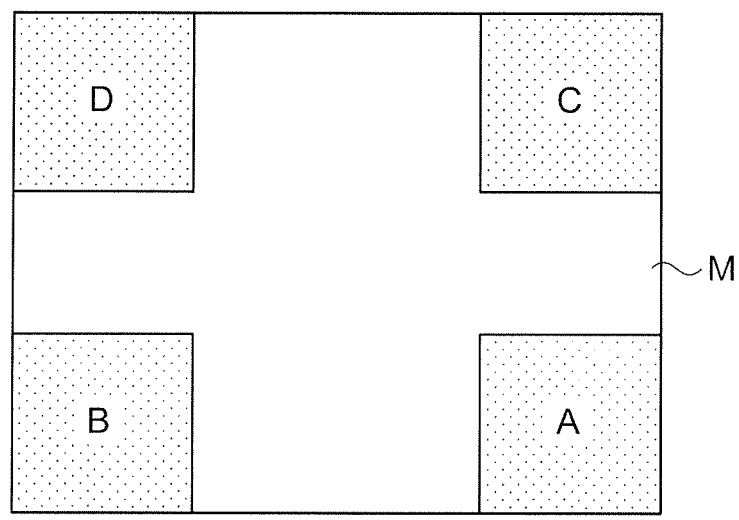
FIG. 4 shows examples of sub image display regions within a main image.
Figure 5:
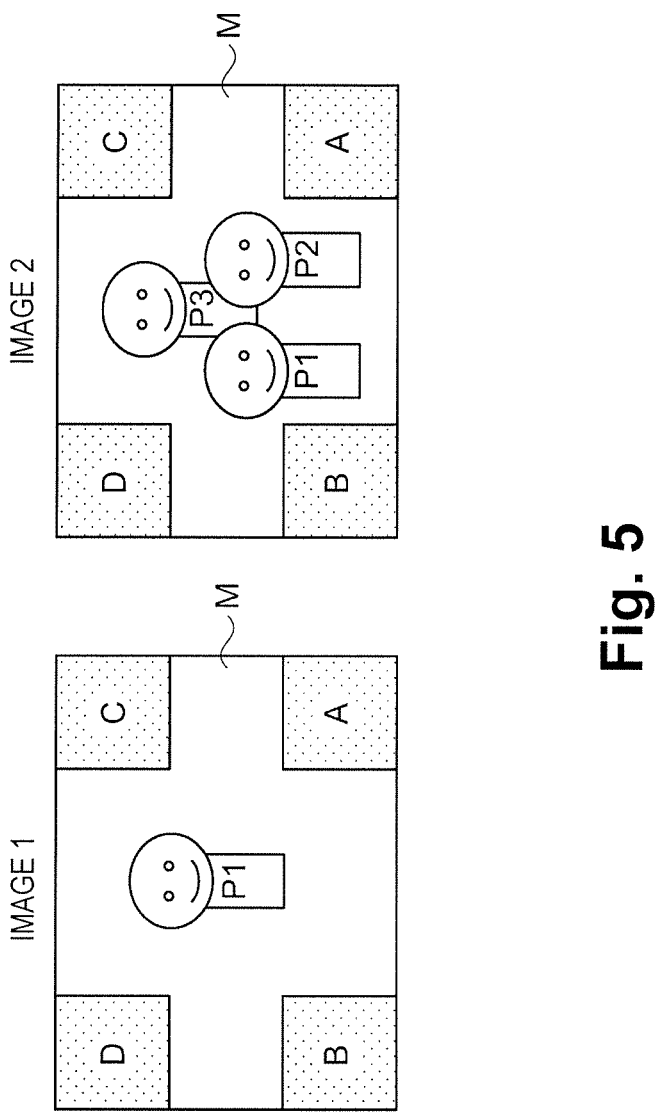
FIG. 5 is shows examples of main images that include a person or people.
Figure 6:
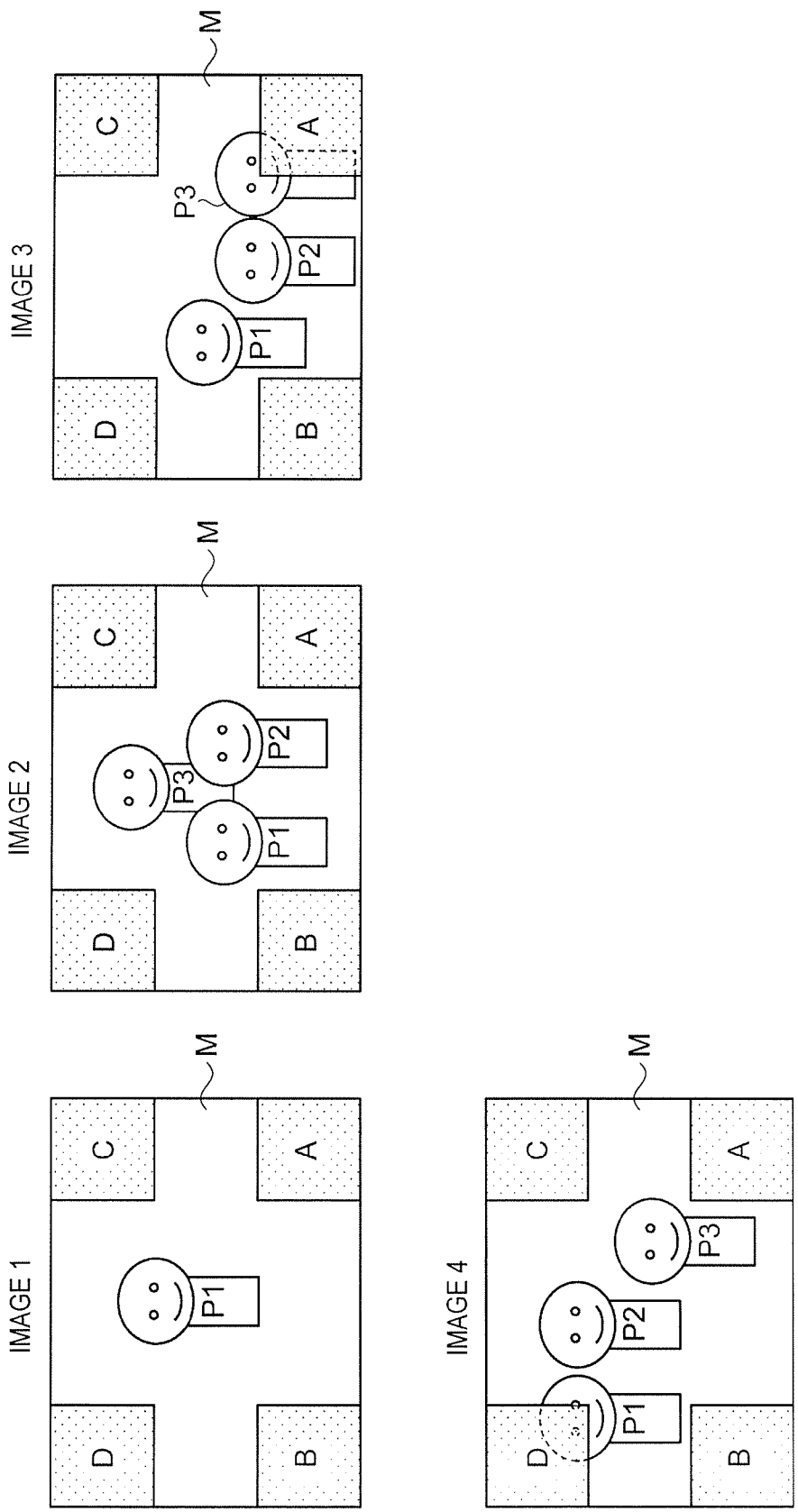
FIG. 6 is shows examples of main images that include a person or people.
Figure 7:
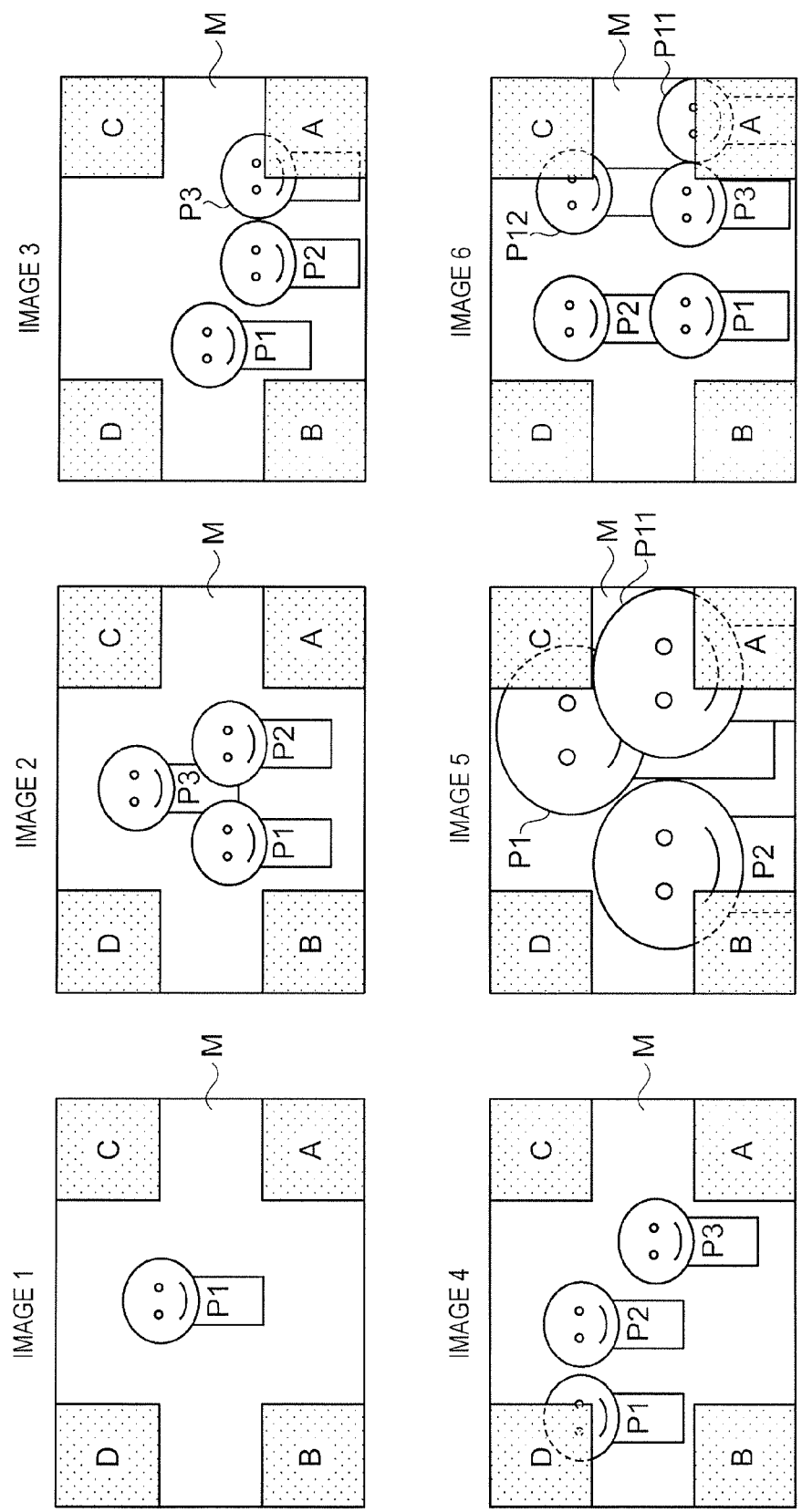
FIG. 7 is shows examples of main images that include a person or people.

FIG. 4 shows an example of sub image display regions A, B, C, and D serving as prospective regions in which a sub image might be displayed within a display region of a main image M displayed on the display section 14. In step S120, the image display apparatus 1 acquires a display position (at four corners of main image M) and region size of each of the sub image display regions A, B, C, and D and a priority degree among the sub image display regions A, B, C, and D (A>B>>C>D). FIGS. 5 to 7 show examples in which a person is included in the main images M. The operation will now be explained using the examples shown FIGS. 4 to 7.

The image display apparatus 1 determines if each of the face regions detected in the main images M in step S110 overlaps with any of the sub image display regions (step S130). More specifically, the image display apparatus 1 determines if face coordinates of each face region lie within each of the sub image display regions. Regarding the face coordinates of the face region compared to the sub image display regions, it is also acceptable to detect a face region of a person in a main image, an image obtained by reducing a size of the main image, or a thumbnail embedded in an image file in advance and convert the obtained face coordinates of the face region such that the coordinates match a size of a display medium. Also, when a main image is reduced, it is acceptable to detect the face regions using an image reduced to a size of a display medium and use the obtained coordinates as is. A face region is expressed as a rectangle, an ellipse, or other shape and the coordinates of a face region are coordinates specifying a point within that shape in terms of coordinates with respect to a reference point, e.g., an upper leftmost pixel of the image.

If no face regions in the main images M overlap with any of the sub image display regions (S130: Yes), then the image display apparatus 1 sets the display position of the sub image display region to a default position using the display position setting section 57 (step S150) and proceeds to step S210. In the example shown in FIG. 5, there are two images 1 and 2 stored in the storage section 16 and neither the face region of the person P1 in the image 1 and nor any of the face regions of the people P1 to P3 in the image 2 overlaps with any of the sub image display regions A, B, C, or D. Thus, the sub image display region A, which corresponds to a default position, is set as the display position.

Meanwhile, if any of the face regions overlaps with any of the sub image display regions (S130: No), then the image display apparatus 1 determines if there is at least one sub image display region that does not overlap with any of the face regions (step S140).

If there is at least one sub image display region that does not overlap with any of the face regions (S140: Yes), then the image display apparatus 1 employs the display position setting section 57 to set a sub image display region having a highest priority degree among the sub image display regions that do not overlap with any of the face regions (step S160) and proceeds to step S210. In the example shown in FIG. 6, there are four images 1 to 4 stored in the storage section 16 and the sub image display regions B and C do not overlap with any of the face regions of the images 1 to 4. Additionally, the sub image display region B has a higher priority degree than the sub image display region C. Thus, the sub image display region B is set as the display position.

Meanwhile, if there is not even one sub image display region that does not overlap with any of the face regions, i.e., if all of the sub image display regions overlap with at least one of the face images (step S140: No), the image display apparatus 1 proceeds to step S170.

In step S170, the image display apparatus 1 employs the facial feature detecting section 54 to execute an organ outline detection in order to detect feature quantities from the face regions overlapped by each of the sub image display regions. Then, the image display apparatus 1 employs the face recognizing section 55 and the face importance degree determining section 56 to find an importance degree of each of the face regions in the main images by executing a face recognition processing with respect to each of the face regions based on the feature quantities of the face regions detected in step S170 and the facial feature information 16*b* and the person importance degree information 16*c* registered in the storage section 16 (step S180).

In the example shown in FIG. 7, there are six images 1 to 6 stored in the storage section 16, the people P3 and P11 overlap with the sub image display region A, the person P2 overlaps with the sub image display region B, the people P1 and P12 overlap with the sub image display region C, and the person P1 overlaps with the sub image display region D. Consequently, the image display apparatus 1 detects feature quantities of the face regions of the people P1, P2, P3, P11, and P12 in step S170 and finds importance degrees of the face regions of the people P1, P2, P3, P11, and P12 in step S180.

FIG. 8 shows an example of a person table based on the facial feature information 16b and the person importance degree information 16c. In the same figure, a feature quantity T1, T2, or T3 is registered as facial feature information and an importance degree 100, 50, or 20 is registered as person importance degree information for each of the people P1, P2, and P3. An importance degree of 10 is registered for any person who is not already registered. Assuming the feature quantities of the face regions of the people P1, P2, P3, P11, and P12 detected in step S170 are T1, T2, T3, T11, and T12, respectively, the importance degrees 100, 50, 20, 10, and 10 of the face regions of the people P1, P2, P3, P11, and P12, respectively, can be found by comparing to the feature quantities in the person table shown in FIG. 8.

In step S190, the image display apparatus 1 calculates an importance degree for each of the sub image display regions based on the importance degrees of the face regions found in step S180. More specifically, the image display apparatus 1 calculates an importance degree for each of the sub image display regions by calculating a sum value of the importance degrees of the face regions that overlap with that particular sub image display region. The image display apparatus 1 then employs the display position setting section 57 to set the sub image display region having the lowest importance degree among the sub image display regions as the display position of the sub image (step S200) and proceeds to step S210.

FIG. 9 illustrates an example of calculating importance degrees for each of the sub image display regions A to D. In the same figure, the importance degree calculations of the examples shown in FIGS. 7 and 8 are shown. For example, the table shows that the sub image display region A overlaps the face region of the person P3 (importance degree 20) in the image 3, overlaps the face region of the person P11 (importance degree 10) in the image 5, and overlaps the face regions of the person P3 (importance degree 20) and the person P11 (importance degree 10) in the image 6. An importance degree of 60 is calculated for the sub image display region A by calculating a sum of the importance degrees of the people. Similarly, an importance degree of 50 is calculated for the sub image display region B, an importance degree of 110 is calculated for the sub image display region C, and an importance degree of 100 is calculated for the sub image display region D. Since the importance degree 50 (shown with a bold border) of the sub image display region B is the lowest among the importance degrees calculated for the sub image display regions, the sub image display region B is set as the display position.

In step S210, the image display apparatus 1 displays one of the main images 16a stored in the storage section 16 on the display section 14. The image display apparatus 1 then displays the sub image in the sub image display region set as the display position (step S220). The image display apparatus 1 then determines if there is a main image 16a stored in the storage section 16 that remains to be displayed (step S230) and repeatedly displays main images 16a (step S210) and sub images (step S220) until there are no more main images 16a to be displayed. The processing sequence is ended when there are no more main images 16a to be displayed, i.e., when all of the main images 16a have been displayed.

In the embodiment described heretofore, while main images are displayed one by one on a display section 14, a sub image is displayed overlapping the main images in a common position corresponding to a portion of the main images. The display position of the sub image is set to a sub image display region that is selected from among a plurality of sub image display regions as a region that does not overlap with a face region of a person. If all of the sub image display regions overlap with a face region as in the example shown in FIG. 7, then a feature quantity is found for each of the face regions and a face recognition operation is executed. Then, an importance degree is calculated for each sub image display region based on the importance degrees of the face regions and a sub image is displayed in the sub image display region having the lowest importance degree. As a result, the sub image is displayed in such a position as to avoid overlapping a face region of a person who is important in the main image and, instead, to overlap a face region of a person who is not so important. Thus, by registering an important person whose face is preferably not hidden in the image display apparatus 1 in advance, the face of the important person can be seen without being hidden by a sub image.

Variation 1

In the previously explained embodiment, an importance degree of a sub image display region is calculated by summing the importance degrees of the face regions that overlap with the sub image display region. However, the invention is not limited to such a calculation and it is also acceptable to calculate the importance degree of a sub image display region based on, for example, an average value of the importance degrees of the overlapping face regions, a highest importance degree among the overlapping face regions, a surface area of each overlapping face region, a ratio of overlapping surface area to total surface area, or an importance degree of a sub image display region.

FIG. 10 illustrates an example of calculating importance degrees for each of the sub image display regions A to D based on a highest importance degree. For example, the highest importance degree associated with the sub images display region A is the importance degree 20 of the person P3 in the images 3 and 6, the highest importance degree associated with the sub image display region B is the importance degree 50 of the person P2 in the image 5, the highest importance degree associated with the sub image display region C is the importance degree 100 of the person P1 in the image 5, and the highest importance degree associated with the sub image display region D is the importance degree 100 of the person P1 in the image 4. Since the importance degree 20 (shown with a bold border) of the sub image display region A is the lowest among the importance degrees calculated for the sub image display regions, the sub image display region B [sic] is set as the display position.

Variation 2

In the previously explained embodiment, an importance degree is calculated for each of the sub image display regions and the sub image display region having the lowest importance degree is set as a display position of a sub image. However, it is acceptable to set the display position in a fashion that takes into account a preset importance degree registered to each of the main images instead of based solely on the importance degrees of the sub image display regions. In this way, when all of the sub image display regions overlap with a face region, the display position of the sub image can be set such that the sub image is less likely to overlap a face position of a person in an important main image than in another main image that is not so important.

Variation 3

In the previously explained embodiment, a plurality of sub image display regions are set and a display position within a display region of the main images, a region size, and a priority degree are defined for each of the sub image display regions. However, the invention is not limited to such an approach and it is acceptable to display a sub image in one sub image display region set such that the display position is variable and the region size is fixed or in one sub image region set such that both the display position and the region size are variable.

In such a case, the sub image display region is set to such a position that it does not overlap a face region detected in the main images. If the sub image overlaps any of the face regions in the main images, then the sub image display region is set based on importance degrees of the face regions. If the region size is variable, then the sub image can be prevented from overlapping an image region by reducing the region size. In this way, overlapping of a sub image with a facial image of a person displayed in the main images can be prevented in a more refined manner.

Variation 4

In the previously explained embodiment, an importance degree of a face region is determined based on an importance degree registered to each person. However, the invention is not limited to such an approach. For example, it is acceptable to detect if a person in a face region is a child or an adult or is male or female and, based on the detection result, calculate an importance degree of the face region based on a preset criterion, such as giving priority to children or giving priority to females.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An image display apparatus comprising:
    a display unit having a first display region configured to display a plurality of main image data one at a time and a second display region located within the first display region and configured to display sub image data, the second display region including at least a first sub display region and a second sub display region, positions of the first sub display region and the second sub display region relative to the first display region being set in advance;
    a face region detecting section configured to detect a face region in the main image data;
    a face importance degree determining section configured to determine a face region importance degree of the face region detected by the face region detecting section;
    a calculating controller configured to calculate a first sub image display region importance degree of the first sub display region and a second sub image display region importance degree of the second sub display region based on the face region importance degree of the face region; and
    a display position setting section configured to set one of the first sub display region and the second sub display region as a display position where the sub image data is displayed based on the first and second sub image display region importance degrees.

2. The image display apparatus of claim 1, further comprising
    a storage section configured to store facial feature information in which a feature quantity regarding a face image of a person is registered and person importance degree information in which an importance degree of a person corresponding to the facial feature information is registered;
    a facial feature detecting section configured to detect a feature quantity of a face region detected by the face region detecting section; and
    a face recognizing section configured to identify a person shown in the face region by matching a feature quantity detected by the facial feature detecting section to facial feature information stored in the storage section,
    the face importance degree determining section being configured to determine the face region importance degree of the detected face region based on stored person importance degree information corresponding to the identified person.

3. The image display apparatus of claim 1, wherein
    the calculating controller calculates each of the first and the second sub image display region importance degrees by calculating at least one from among a sum value, a maximum value, and an average value of the face region importance degree of each of the first sub display region and the second sub display region.

4. The image display apparatus of claim 1, wherein
    the image position setting section sets the display position based on an importance degree of each image set in advance with respect to the main image data.

5. An image display method comprising:
    displaying a plurality of main image data in a first display region one at a time and displaying sub image data in a second display region located within the first display region, the second display region including at least a first sub display region and a second sub display region, positions of the first sub display region and the second sub display region relative to the first display region being set in advance, detecting a face region in the main image data;

determining a face region importance degree of the face region;

calculating a first sub image display region importance degree of the first sub display region and a second sub image display region importance degree of the second sub display region based on the face region importance degree of the face region; and setting one of the first sub display region and the second sub display region as a display position where the sub image data is displayed based on the first and second sub image display region importance degrees.

6. The image display apparatus of claim 1, wherein the display position setting section sets the first sub display region as the display position when the first sub image display region importance degree of the first sub display region is lower than the second sub image display region importance degree of the second sub display region.

\* \* \* \* \*